(12) United States Patent
Reid

(10) Patent No.: US 7,537,691 B2
(45) Date of Patent: May 26, 2009

(54) POOL CLEANING APPARATUS

(76) Inventor: Worrell A. Reid, 5909 Megan Dr., Hamilton, OH (US) 45011

( * ) Notice: Subject to any disclaimer, the term of this patent is extended or adjusted under 35 U.S.C. 154(b) by 235 days.

(21) Appl. No.: 11/532,269

(22) Filed: Sep. 15, 2006

(65) Prior Publication Data

US 2007/0007192 A1    Jan. 11, 2007

Related U.S. Application Data

(63) Continuation-in-part of application No. 10/922,126, filed on Aug. 16, 2004, now abandoned.

(51) Int. Cl.
*E04H 4/12*    (2006.01)
(52) U.S. Cl. ............................. 210/167.12; 210/416.2
(58) Field of Classification Search .............. 210/167.1, 210/167.12, 167.13, 416.1, 416.2; 15/1.7
See application file for complete search history.

(56) References Cited

U.S. PATENT DOCUMENTS

| | | | | |
|---|---|---|---|---|
| 1,764,259 A | * | 6/1930 | Hansen | ........................ 417/405 |
| 3,355,026 A | * | 11/1967 | Schut | ....................... 210/416.5 |
| 3,542,201 A | * | 11/1970 | Belonger et al. | .......... 210/167.1 |
| 3,694,263 A | | 9/1972 | Korn, Sr. | |
| 3,886,616 A | | 6/1975 | Hayes | |
| 4,240,174 A | | 12/1980 | Thiem et al. | |
| 4,275,474 A | | 6/1981 | Woodard | |
| 4,351,723 A | * | 9/1982 | Palmer | ..................... 210/198.1 |
| 4,430,214 A | | 2/1984 | Baker | |
| 4,558,479 A | | 12/1985 | Greskovics et al. | |
| 4,581,075 A | | 4/1986 | St. Martin | |
| 4,615,802 A | | 10/1986 | Harbaugh | |
| 4,657,673 A | * | 4/1987 | Kessler | ....................... 210/108 |
| 4,683,599 A | | 8/1987 | Reif | |
| 4,705,629 A | | 11/1987 | Weir et al. | |

4,801,376 A    1/1989 Kulitz (Continued)

FOREIGN PATENT DOCUMENTS

DE    3808407 A1    9/1989

(Continued)

OTHER PUBLICATIONS

International Search Report and Written Opinion from international application No. PCT/US07/65593 mailed Jun. 19, 2008.

*Primary Examiner*—Fred Prince
(74) *Attorney, Agent, or Firm*—R. Eric Gaum; William S. Nabors

(57) ABSTRACT

A pool cleaning apparatus is provided that employs a pump and a filtering device. An engine or motor drives the pump. The pump draws water and debris into the pool cleaning apparatus through a wand. The pump moves the water through the filtering device to remove debris. The filtering device comprises a vessel having a sealable lid. The vessel contains a tube for transporting water and debris into the vessel, a leaf trap for catching debris, a primary filter of polyester fiber, and a positive stop having a gasket. The primary filter sits on the gasket, with the leaf trap resting above the primary filter. Both the leaf trap and the primary filter have a hole through which the tube extends, and handles. The primary filter houses a filtration element which is washable and disposable. The pool cleaning apparatus may be mounted onto a cart, or be permanently installed.

16 Claims, 19 Drawing Sheets

U.S. PATENT DOCUMENTS

| | | | |
|---|---|---|---|
| 4,808,081 A | 2/1989 | Finley | |
| 4,835,809 A | 6/1989 | Roumagnac | |
| 4,849,024 A | 7/1989 | Supra | |
| 5,114,574 A * | 5/1992 | Barry | 210/137 |
| 5,317,776 A | 6/1994 | DeMoura | |
| 5,417,851 A * | 5/1995 | Yee | 210/167.01 |
| 5,557,819 A | 9/1996 | Krolikowski | |
| 5,720,068 A | 2/1998 | Clark et al. | |
| 5,750,022 A * | 5/1998 | Blake et al. | 210/167.12 |
| 5,930,856 A | 8/1999 | Van Der Meyden et al. | |
| 5,933,899 A | 8/1999 | Campbell et al. | |
| 5,954,972 A | 9/1999 | Polimeni, Jr. | |
| 6,004,470 A * | 12/1999 | Abril | 210/776 |
| 6,017,400 A * | 1/2000 | Clark et al. | 134/21 |
| 6,241,877 B1 * | 6/2001 | Berkey | 210/97 |
| 6,464,884 B1 * | 10/2002 | Gadgil | 210/748 |
| 6,471,856 B1 * | 10/2002 | Keith | 210/167.12 |
| 6,502,269 B1 | 1/2003 | Balchan et al. | |
| 6,572,765 B2 | 6/2003 | Lincke | |
| 6,852,218 B2 | 2/2005 | Vila Corts | |
| 6,866,774 B1 | 3/2005 | Stephenson | |
| 6,922,855 B1 | 8/2005 | Swalley et al. | |
| 2003/0024863 A1 * | 2/2003 | Gannon et al. | 210/134 |
| 2003/0106174 A1 | 6/2003 | Kallenbach et al. | |
| 2003/0208862 A1 | 11/2003 | Henkin et al. | |
| 2006/0021922 A1 | 2/2006 | Lamberts Van Assche | |
| 2006/0032801 A1 | 2/2006 | Reid | |

FOREIGN PATENT DOCUMENTS

| | | |
|---|---|---|
| EP | 0989257 A2 | 3/2000 |
| FR | 2790501 A1 | 9/2000 |

* cited by examiner

POOL CLEANING APPARATUS

This application is a continuation in part of U.S. patent application Ser. No. 10/922,126 filed Aug. 16, 2004, which is hereby incorporated by reference.

BACKGROUND

1. Field of the Invention

The present invention relates to an apparatus for cleaning swimming pools, spas, and hot tubs, reflection pools, and other water features.

2. Description of the Related Art

Outdoor swimming pools are often exposed to sources of contamination. Leaves and sticks fall from surrounding trees, grass clippings eject from lawn mowers, and dirt and other trash are commonly near a swimming pool. Wind blows the grass, sticks, dirt, and other trash into the swimming pool, making the pool unsanitary and unpleasant to swim in.

To help maintain proper sanitation, swimming pools commonly include a circulation pump and filter system. The circulation pump draws water from the pool, pumps the water through a filter, and then returns the water to the pool. A strainer is typically installed where the circulation pump draws water from the swimming pool. The strainer is designed to strain leaves and other debris from the water in order to protect the circulation pump.

When many leaves and debris fall into the swimming pool, the pool requires additional cleaning beyond the installed filter system. Many pool-cleaning devices are available to move along the swimming pool bottom and lift debris from the bottom. Some pool-cleaning devices are categorized as suction type pool cleaners; other pool-cleaning devices are categorized as pressure type pool cleaners.

Present suction type pool cleaners typically use the swimming pool's circulation pump to develop suction, and some use the swimming pool's filter system to remove debris. Typical examples of suction type pool cleaners include U.S. Pat. No. 4,849,024 to Supra, U.S. Pat. No. 5,720,068 to Clark, and U.S. published patent application 2003/0208862 to Henkin. However, suction type pool cleaners that use the pool's filter system can put a heavy burden on the circulation pump and filter system. As leaves and debris accumulate in the strainer, the flow of water to the circulation pump is reduced. The strainer must be cleaned out repeatedly to prevent clogging, which reduces suction and potentially can cause harm to the circulation pump. In addition, circulation pumps typically need to be primed, which is inconvenient and time consuming for the operator. Because of the demands on the circulation pump, present suction type pool cleaners commonly have low suction and are limited in their ability to pick up heavy debris such as pebbles or sand. When the swimming pool's filter system is used to remove debris, the additional load on the filter makes filter maintenance and cleaning more frequent.

Pressure type pool cleaners operate on pressurized water that is supplied to the pool cleaner through a hose. The pressurized water is used to drive blades of a turbine that induce a flow of pool water into a collection bag. Some pressure type pool cleaners use a booster pump to generate added water pressure because the circulation pump used in many swimming pools does not create sufficient water pressure for effective cleaning. Typical examples of pressure type pool cleaners include U.S. Pat. No. 5,933,899 to Campbell, U.S. Pat. No. 5,930,856 to Van Der Meyden, and U.S. Pat. No. 4,558,479 to Greskovics. While all of the pool-cleaning devices and systems available have furthered the art of swimming pool cleaning, none of the known prior art addresses a pool cleaner that can quickly and efficiently remove a large quantity of debris from a swimming pool or other water feature. There remains a need for a powerful and efficient pool cleaning system and apparatus that does not rely on the circulation pump and filter system of the swimming pool for its power, is easy to use, and which is inexpensive to maintain.

SUMMARY OF THE INVENTION

In response to the foregoing concerns, the present invention provides an apparatus for cleaning swimming pools, spas, fountains, and other water features. One embodiment of the pool cleaning apparatus includes a pump with an inlet and an outlet, suited to pump a mixture of contaminants (such as leaves and pebbles) and liquid (such as water). A gasoline or electric engine is coupled to the pump to drive the pump. The pump provides suction to draw the mixture of contaminants and liquid into a vacuum wand that is connected to the pump inlet. The vacuum wand is designed to lift debris and water from the bottom of a swimming pool and may be configured with a long handle, or may be configured to move about the bottom of a swimming pool automatically when the pump is operating.

The mixture of contaminants and liquid entering the pump inlet are expelled through the pump outlet into a transfer pipe, then through a filtering device. The filtering device includes a trap to strain large debris and items such as leaves, grass clippings, worms, coins, and pebbles, and a primary filter for straining smaller particles, such as sand, algae, small bugs, and dirt. The filtered water flows out of the filtering device through a discharge hose, and back into the swimming pool. In one embodiment, the primary filter comprises a permeable foam or fibrous material. In a further embodiment, the pool cleaning apparatus includes a pump with an inlet and an outlet, and a filtering device with an inlet and an outlet. A vacuum wand is attached to the inlet of the filtering device. The outlet of the filtering device is attached to the pump inlet. In this embodiment, suction from the pump draws a mixture of contaminants and liquid from a pool of water through the vacuum wand and through the filtering device comprising a leaf trap and a filter, where the contaminants are filtered out. The suction of the pump then draws filtered water from the filtration device through the pump. The filtered water is expelled out of the pump outlet and back to the pool.

In one embodiment, the pool cleaning apparatus is mounted to a cart or hand truck so that the apparatus is portable, and may, during swimming season, be attachable to an above ground pool where it functions both as a water purification system and as a pool cleaner. In another embodiment, the pool cleaning apparatus is permanently installed pool-side, where it functions both as a water purification system, and as a pool cleaner.

The following description sets forth in detail certain illustrative embodiments of the invention, these being indicative of but a few of the various ways in which the principles of the present invention may be employed.

DETAILED DESCRIPTION

As used in this specification and the appended claims, the word debris means particles and substances that contaminate pool water, including larger items such as, but not limited to, leaves, grass clippings, worms, trash, coins, and pebbles, and smaller particles such as, but not limited to, sand, algae, small bugs, and dirt.

Figure 1:
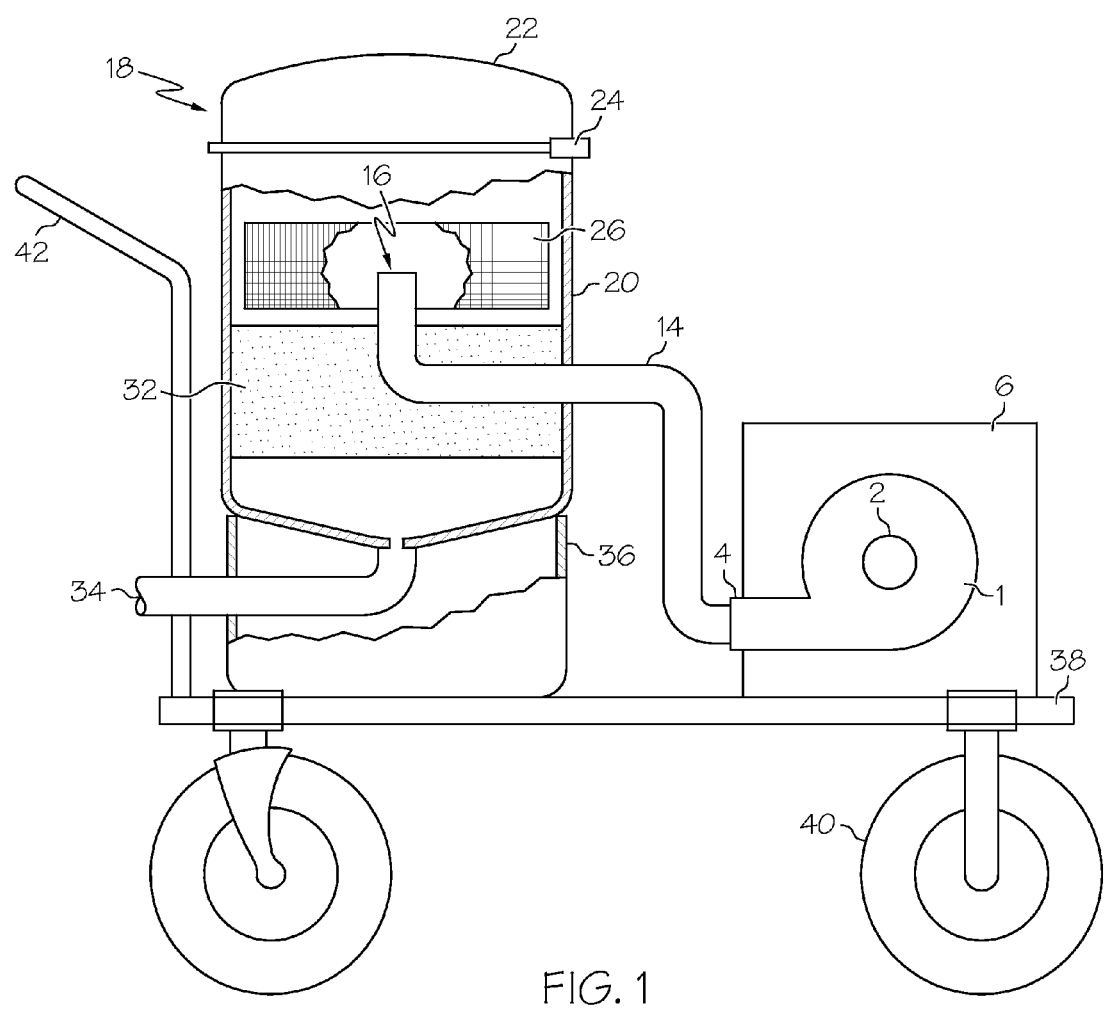
FIG. 1 is a side elevational view in partial cross section of a first embodiment of the pool cleaning apparatus.
Figure 2:
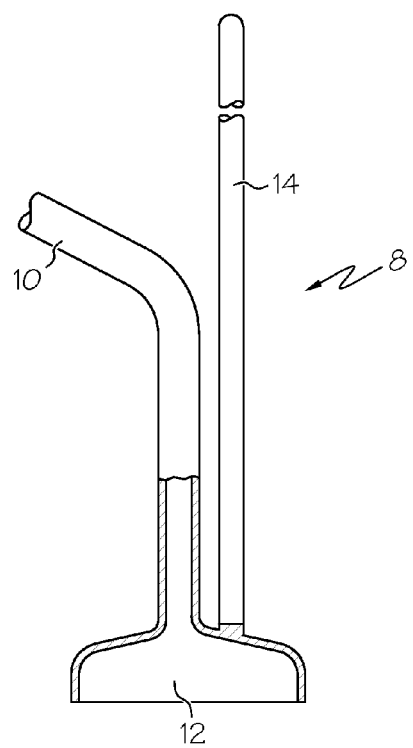
FIG. 2 is a side elevational view in partial cross section of a vacuum wand for the pool cleaning apparatus.
Figure 4:
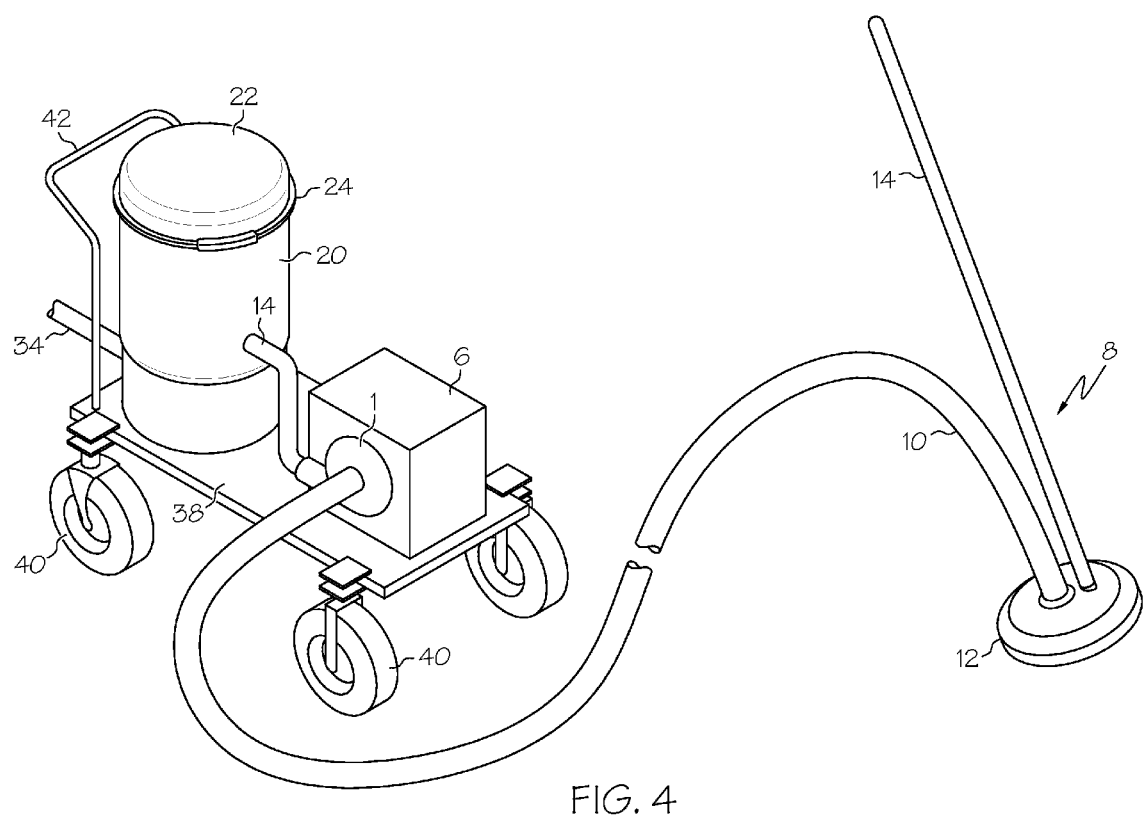
FIG. 4 is a side perspective view of a first embodiment of the pool cleaning apparatus.

Referring to FIGS. 1 and 4, a first embodiment of the pool cleaning apparatus of the present invention includes a pump 1 that has a pump inlet 2 and a pump outlet 4. The pump 1 is driven by a motor 6, and is configured to pump a mixture of contaminants and liquid. A vacuum wand 8 is illustrated in FIG. 2. The vacuum wand 8 includes a hose 10, an intake aperture 12, and a handle 14. The hose 10 is connected to the pump inlet 2, whereby the pump 1 can draw a mixture of contaminants and liquid from a pool of water through the intake aperture 12 and into the pump inlet 2. The pump 1 expels the mixture of contaminants and liquid through the pump outlet 4 into a transfer pipe 13. The mixture of contaminants and liquid flow through the transfer pipe 13 to a trap inlet 16, located inside of a filtering device 18.

The filtering device 18 includes a vessel 20 and a lid 22. The lid 22 is secured to the vessel 20 by a lid clamp 24. Inside the vessel 20, the mixture of contaminants and liquid discharge through the trap inlet 16 into a trap 26.

Figure 3:
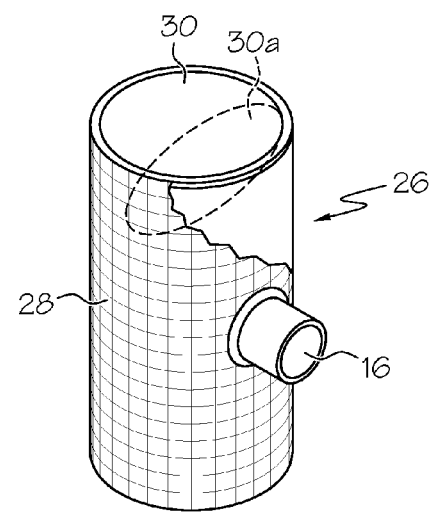
FIG. 3 is a side perspective view in partial cross section of a trap for the pool cleaning apparatus.

The trap 26 is situated to strain larger contaminants such as leaves and pebbles out of the mixture. Referring to FIG. 3, the trap 26 includes one or more peripheral surfaces 28 defining a container shaped to capture debris. The peripheral surfaces 28 include a plurality of holes or perforations to allow water to flow through the trap 26 but to retain contaminants such as leaves and pebbles inside of the trap 26. The trap 26 is removable for cleaning when the lid 22 is opened. In one embodiment, trap 26 further comprises an access door 30. The access door 30 is hinged to allow the operator to push the access door open as shown by position 30a. The access door may be spring loaded to hold the access door 30 closed.

The partially separated liquid mixture passes through a primary filter 32. The primary filter 32 is a permeable foam or fibrous material in one embodiment. The primary filter 32 acts to further separate contaminants from the liquid before the liquid is expelled through a discharge hose 34. In a normal operation, the discharge hose 34 returns filtered water back to the pool of water.

In one embodiment, the filtering device 18 sits on a base 36. In another embodiment, the filtering device 18 includes features to sit without a base 36.

In one embodiment, the foregoing components are mounted to a cart 38, which has wheels 40 and a cart handle 42. The cart 38 makes the pool cleaning apparatus portable.

Figure 5:
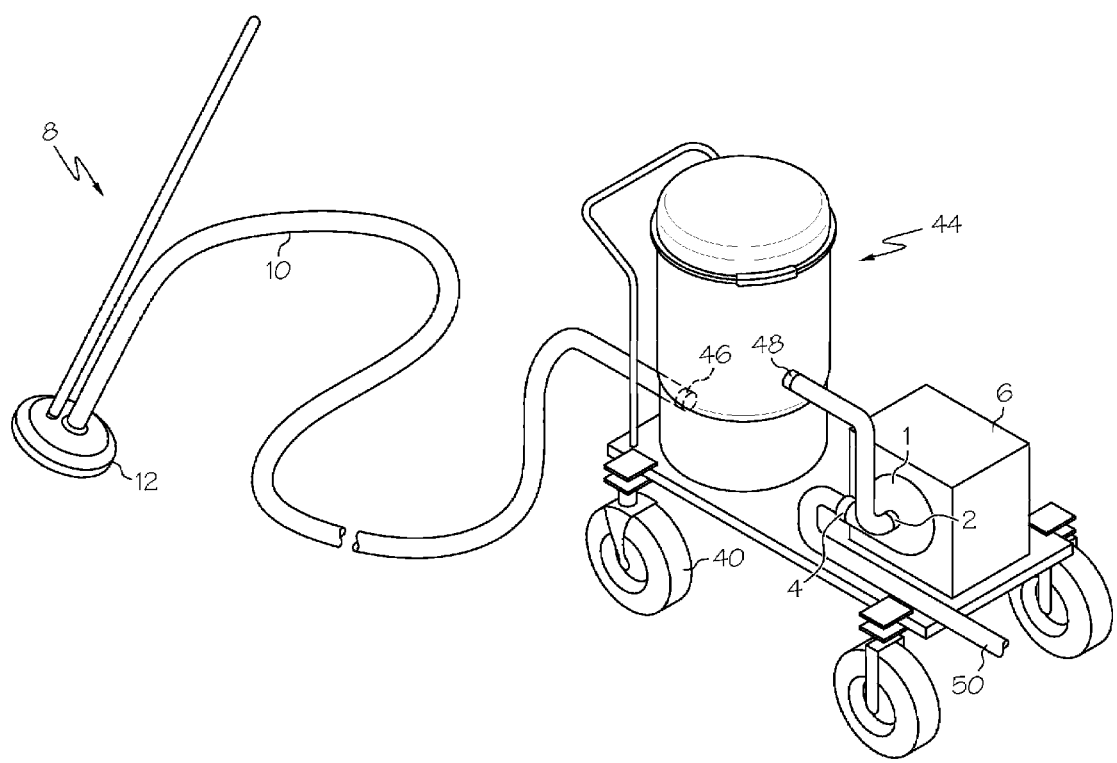
FIG. 5 is a side perspective view of a second embodiment of the pool cleaning apparatus.

A second embodiment is illustrated in FIG. 5. The second embodiment includes a filtering device 44 with a filtering device inlet 46 and a filtering device outlet 48. The hose 10 of the vacuum wand 8 is connected to the filtering device inlet 46. The second embodiment includes a pump 1, with a pump inlet 2 and a pump outlet 4. The pump inlet 2 is connected to the filtering device outlet 48. The pump outlet 4 is connected to a discharge hose 50. The pump 1 is driven by a motor 6 and is sized so that the suction from the pump 1 will draw a mixture of contaminants and liquid from a pool of water through the intake aperture 12, through the hose 10, and through the filtering device 44. The filtering device 44 removes the contaminants from the mixture, and filtered water passes through the filtering device outlet 48 and into the pump inlet 2. The filtered water is expelled through the pump outlet 4 and through the discharge hose 50.

In the first embodiment, the pump 1 is a pass through pump suited to transferring a mixture of debris and liquid. In one embodiment, the pass through pump 1 is a type of pump commonly known in the art as a trash pump, which is configured to pass a mixture of debris and liquid. A trash pump has benefits over a regular pump because a trash pump is more durable and reliable for water that contains debris such as leaves and small pebbles. In the first and second embodiments, the pump 1 is self-priming.

In one embodiment, the motor 6 is a gasoline engine. Gasoline engines of this type are commonly available from manufacturers such as Briggs and Stratton or Honda and are well known in the art. Other types of engines or motors may be used as well. Some embodiments of the pool cleaning apparatus may use a suitable electric motor, or might operate with an engine of an alternate fuel, such a diesel engine.

The design of the filtering device 18 includes a method for removing the trap 26. As the trap 26 fills with leaves or other contaminants, it will become clogged, reducing the effectiveness of the apparatus. By unlatching the lid clamp 24, the operator can open the lid 22. Once the lid 22 is opened, the trap 26 can be removed and cleaned.

The primary filter 32 may be comprised of a permeable foam or fibrous material. The permeable foam or fibrous material is removable when the lid 22 is open for cleaning or replacement. The operator can remove the permeable foam or fibrous material and clean it with a garden hose.

The handle 14 on the vacuum wand 8 is elongated so the operator can reach to the bottom of a swimming pool. The intake aperture 12 and hose 10 are of large enough diameters to draw in water with leaves and small sticks. In alternate embodiments, the vacuum wand 8 does not have the elongated handle 14. Instead, the vacuum wand 8 is designed to automatically move around the bottom of the pool when the pump is operating. Automatic propulsion of pool-cleaning devices is disclosed in U.S. Pat. No. 4,835,809 to Roumagnac and U.S. Pat. No. 5,933,899 to Campbell, which are herein incorporated by reference.

In another embodiment, the pool cleaning apparatus is mounted onto a cart 38 with wheels 40. The wheels 40 may be suited to roll over grass and gravel. The cart 38 has four wheels 40, but other designs could utilize two or three wheels 40 in alternate configurations. In alternate embodiments, the water filtrating system is permanently installed next to a pool of water and does not use a cart 38.

Many backyard pools have narrow walks with tight turn radiuses through which the homeowner may need to maneuver. Pool ladders, planters, plants, and other structures present added obstacles. For improved maneuverability and weight, the cart 38 may be a two-wheel hand truck, and additional embodiments are shown below to more clearly depict the various embodiments associated with the two-wheel version of the apparatus.

Referring to FIGS. 6-11 and 15, a third embodiment of the invention, includes the pass through pump 1 that has a pump inlet 2 and a pump outlet 4, and a motor 6. The pass through pump is configured to pass debris directly through the pump. The motor may be gas or electric. In this embodiment, the motor 6 is electric. Electric power is often available pool side, the electric motor is quieter and generally maintenance free, and electric power may be cheaper than gasoline. Nonetheless, a gas engine may be utilized where it is impractical to use electric power, such as where the operator is in the business of cleaning pools, and must provide his own power.

In one embodiment, the pass through pump 1 has a semi-open to open (depending on the size of solids being passed), clog-resistant impeller, which allows leaves and debris to pass through the pump 1 without getting caught therein. In this embodiment, the pass through pump 1 uses a pump style commonly known in the art as a trash or semi-trash pump, which is configured to pass a mixture of debris and liquid. If the pump 1 does not come with an internal mechanism for maintaining pump prime, then a check valve 137 having a check valve inlet 138 and a check valve outlet 139 may be fitted onto the pump inlet 2 to maintain prime. A tapering plastic nipple 101 is fitted onto the check valve inlet 138.

The vacuum wand 8 or an automatic vacuum wand 402 fits onto the tapering plastic nipple 101 during operation. Leaves and debris enter the vacuum wand 8 through an aperture 12 in the brush head which is a part of the vacuum wand 8. In one embodiment, the brush head is hingedly attached to the elongated handle 14, and is removable from the elongated handle 14.

Figure 10:
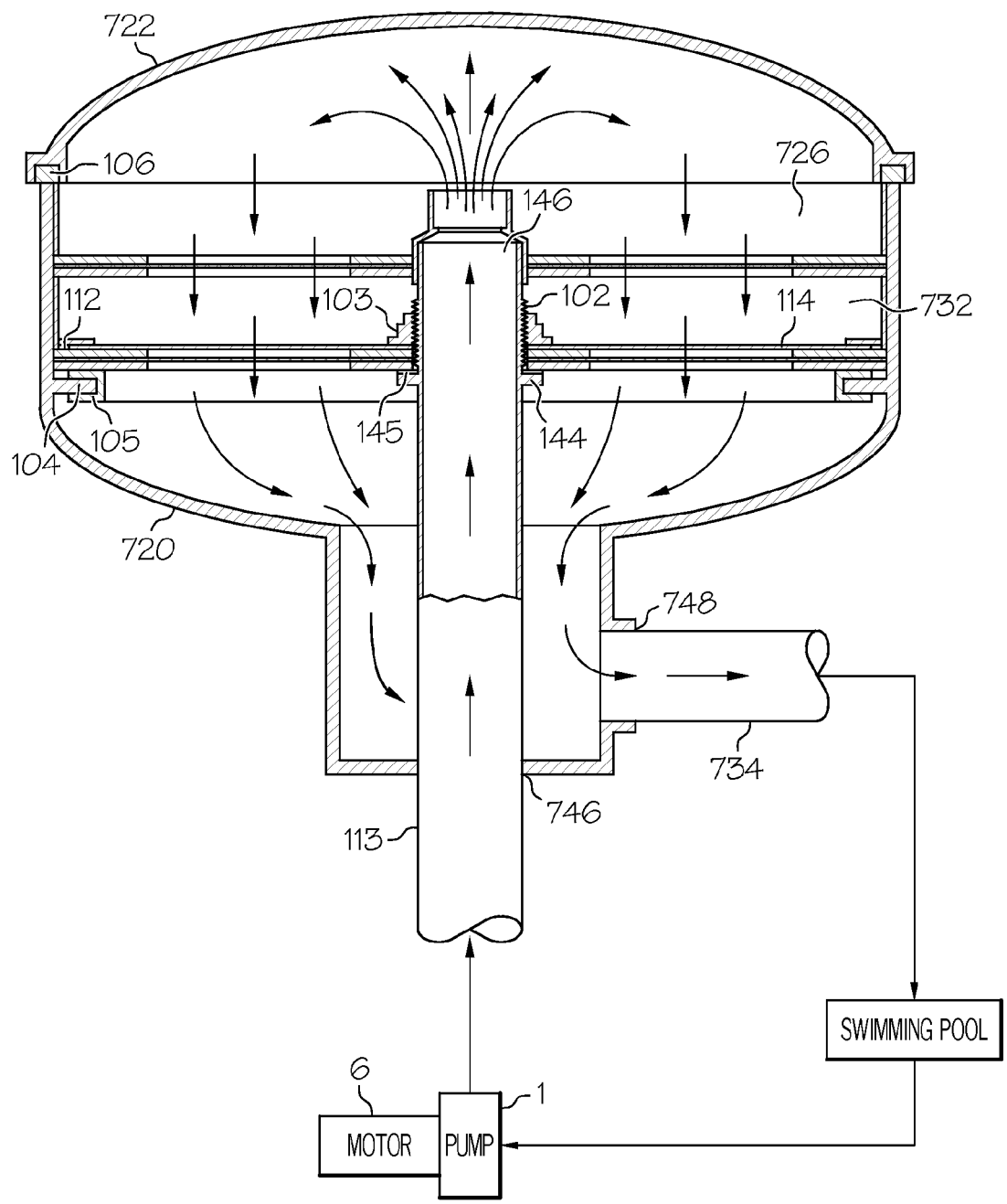
FIG. 10 is a cross section of the filtration device shown in FIG. 9, with arrows illustrating the flow of water through the filtration device.

Referring now to FIG. 10, water containing leaves and debris are drawn through the vacuum wand 8 and the pump 1, and through a transfer pipe 113 into a filtration device 718. In this embodiment, the filtration device 718 features a water tower design. The filtration device 718 comprises a modified leaf trap 726 and a filter 732. Water laden with leaves and debris enters the filtration device 718 through a filtration device inlet 746, which may be positioned beneath the filter 732, and enters a vessel 720 through an inlet tube 102. The inlet tube 102 extends into a leaf trap spout 900 positioned to dispense the water laden with leaves and debris into the modified leaf trap 726. In this embodiment, the inlet tube 102 is positioned vertically within the filtration device 718, passing through the center of the vessel 720 and the filter 732. In the embodiment of FIG. 10, the central inlet tube 102 is connected to the outlet of the pump by way of the transfer pipe 113 and the inlet 746.

Figure 9:
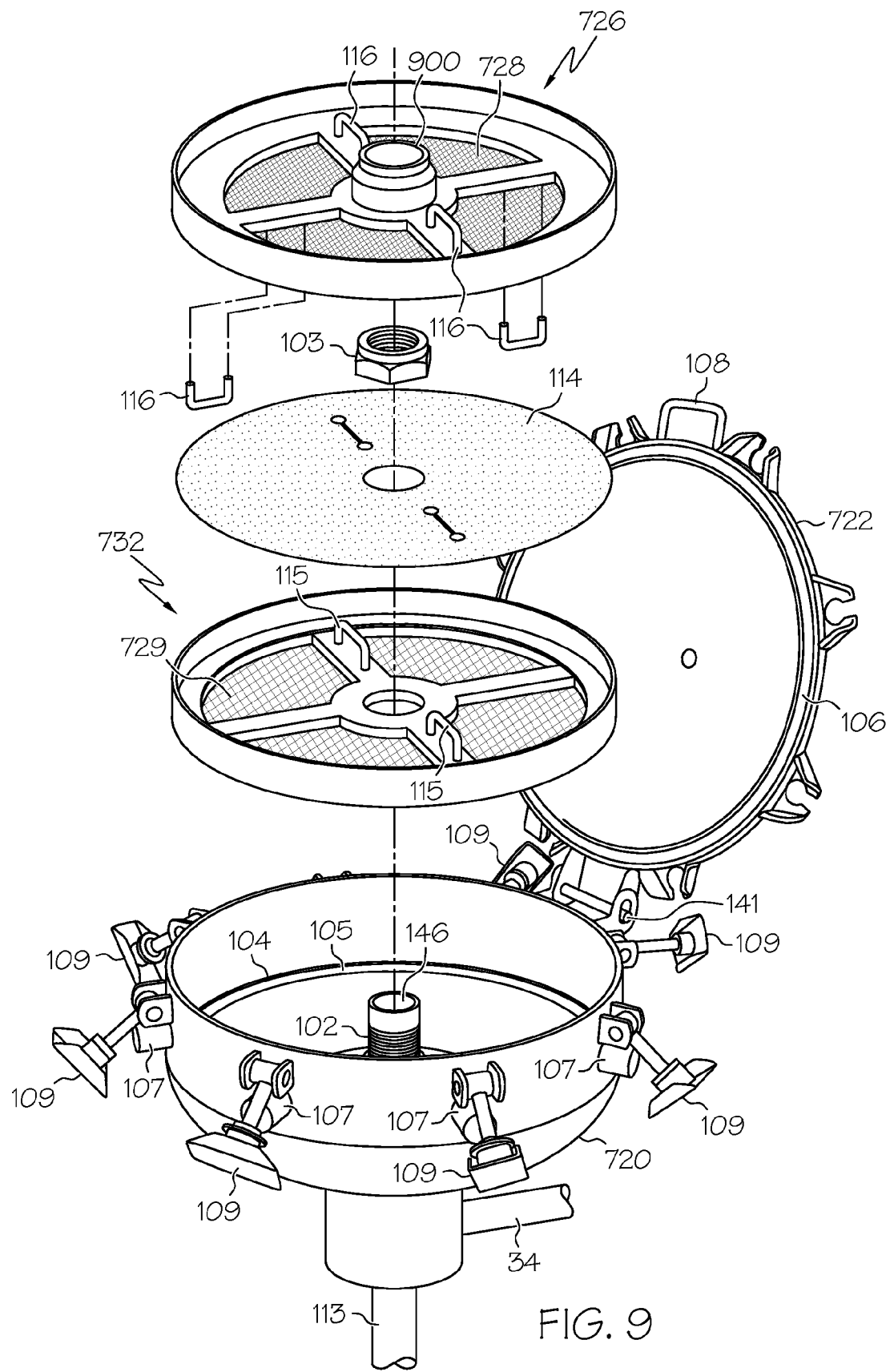
FIG. 9 is an exploded view of the filtration device located on the pool cleaning apparatus shown in FIG. 8.

The vessel 720 has a side wall having a positive stop 104 around its perimeter and a gasket 105 around the positive stop 104, and the inlet tube 102 has a tube flange 144. A flange gasket 145 may be placed on the tube flange 144 to seat and seal against the filter 732. As illustrated in FIGS. 9 and 10, the modified filter 732 sits on the gasket 105 and positive stop 104, and the flange gasket 145 and tube flange 144.

Figure 11:
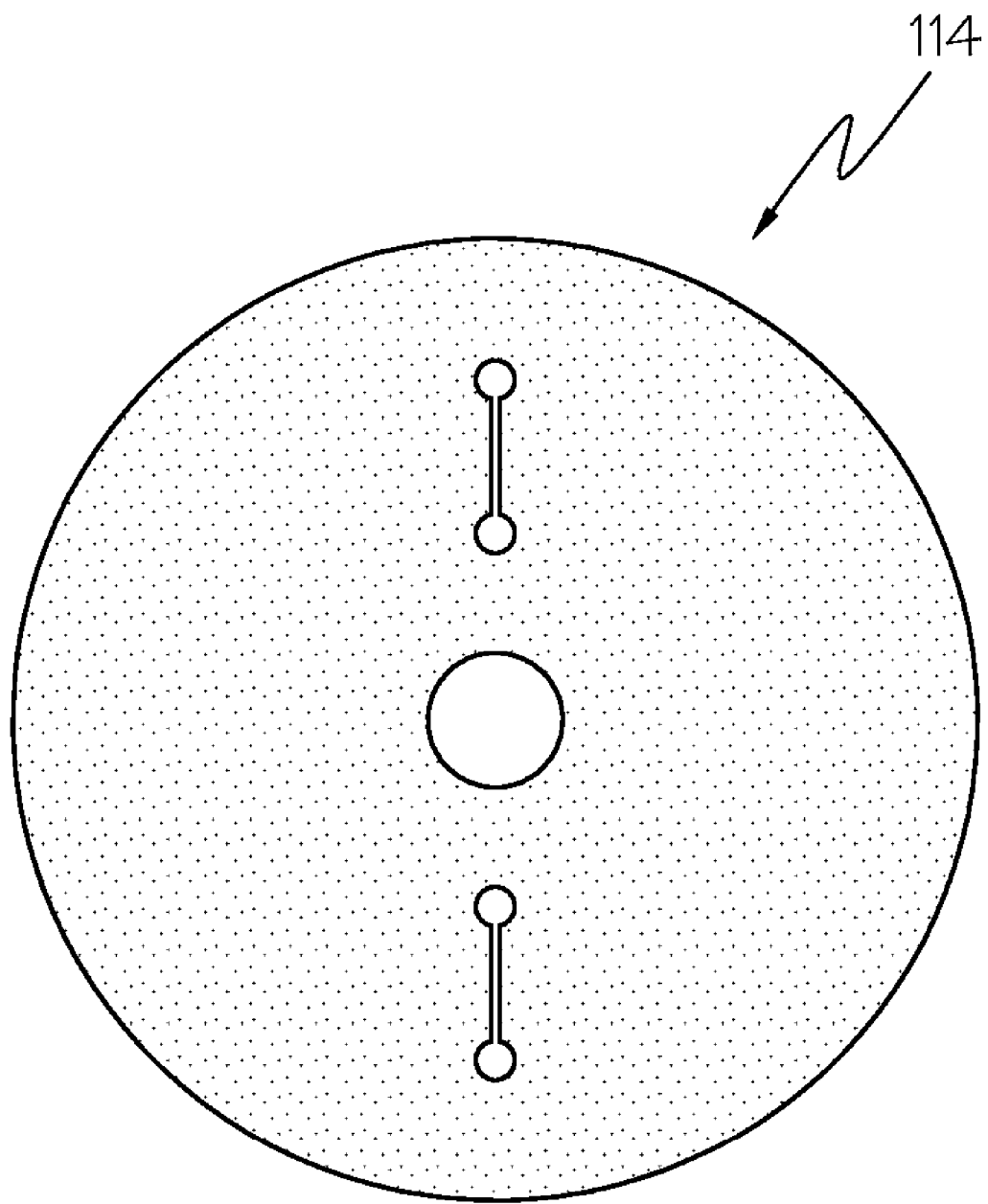
FIG. 11 is a top view of the filtration element contained in the filtration device of the third, fourth, fifth, and sixth embodiments described herein.

The filter 732 comprises a filter container 729 having peripheral surfaces, and a recess 112, as shown in FIG. 9. The filter 732 may have one or more handles 115 to aid in its removal from the vessel 720. As illustrated in FIG. 11, the filtration element 114 has apertures and slits that enable it to fit over the handles 115 and the inlet tube 102. In alternate embodiments, the filtration element 114 may be shaped to fit around the handles 115 and the inlet tube 102. The filter 732 and the filtration element 114 are held securely to the vessel 720 by a flange nut 103, which screws unto the inlet tube 102.

The filter container 729 may be manufactured from a metal or plastic material, or a stainless steel screen suitable for housing a filtration element 114. The filter container 729 may be manufactured by thermoplastic injection molding, or by other techniques, and may comprise one or more apertures for allowing the flow of water through the filter container 729 of the filter 732.

In the embodiment depicted in FIG. 10, the filtration element 114 is positioned in the recess 112 of the filter 732. In this embodiment, the filtration element 114 is a fibrous polymer filtration element comprising polyester fibers. In alternate embodiments, other thermoplastic or polymer fibers may be used in the filtration element 114, producing a product that filters fine particles and is conducive to backwashing. In one embodiment having a polyester fiber filtration element, particles that are greater than 5-10 microns are removed by the filtration element 114 without any noticeable reduction in flow.

In one embodiment, the leaf trap 726 is omitted, and the filter 732 comprises the filter element 114.

The leaf trap 726 has surfaces 728 comprising a screen suitable for catching leaves and debris. The modified leaf trap 726 may be manufactured from a plastic, or a metal such as stainless steel, or a combination of plastic and metal. The modified leaf trap 726 may match the interior shape of the vessel 720. In the embodiment exemplified by FIG. 9, the vessel 720 and the modified leaf trap 726 have a round shape, with the diameter of the modified leaf trap 726 being approximately ⅛ of an inch smaller than the inside diameter of the vessel 720. Debris which passes through the modified leaf trap 726 is trapped in the filter 732. It is contemplated that the leaf trap 726 may be larger in diameter than the filter 732.

As depicted in FIGS. 9 and 10, the central inlet tube 102 passes through the center of the modified leaf trap 726, and having an outlet 146 extending into the leaf trap spout 900. The modified leaf trap 726 rests on the periphery of the filter 732, which in turn sits on the positive stop 104. The leaf trap has two or more leaf trap handles 116 that are used to remove it from the vessel 720, and during cleaning operations.

In one embodiment, the filter container 729 comprises a stainless steel screen having apertures larger than ⅛ of an inch. A lower peripheral edge of the filter container 729 rests on the gasket 105 on the positive stop 104, sealing the filter 732 against the side wall around the perimeter of the vessel. In the embodiment of FIG. 10, the positive stop 104 orients the filter 732 in a substantially horizontal orientation.

The operator may invert the filtration element 114 to backwash the filtration element 114 inside the filtration device 718 without the use of garden hose or other external water source. When the filter 732 is removed, the modified leaf trap 726 may also be inverted inside the vessel 720 during backwashing. Alternately, the operator may backwash the filtration device 718 with a garden hose.

Figure 7:
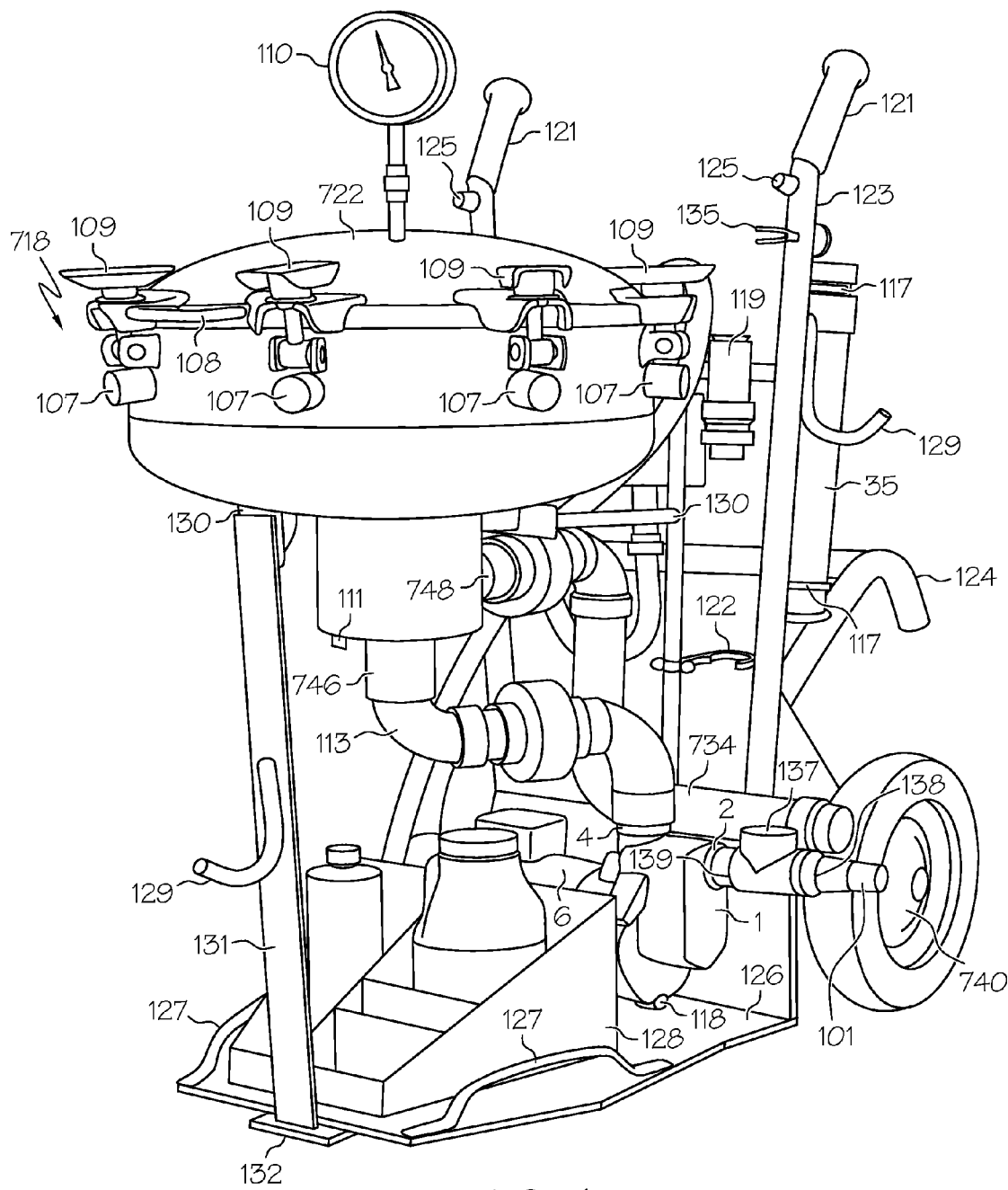
FIG. 7 is a perspective view of the pool cleaning apparatus shown in FIG. 6 showing the front right side thereof.

As illustrated in FIGS. 7 and 9, the vessel 720 has an access opening, closed by a lid 722. The lid 722 comprises a lid gasket 106, and one or more hold down latches 109 to tighten the lid 722 against the lid gasket 106. Hold down bumpers 107 protect the vessel 720 during loosening of hold down latches 109. A lid handle 108 is used to gain access to the interior of the vessel 720. The vessel 720 contains a drain 111 to remove water during cleaning or storage. In the embodiment of FIG. 7, the lid 722 is hingedly attached to the vessel 720 by one or more hinges 141.

Figure 6:
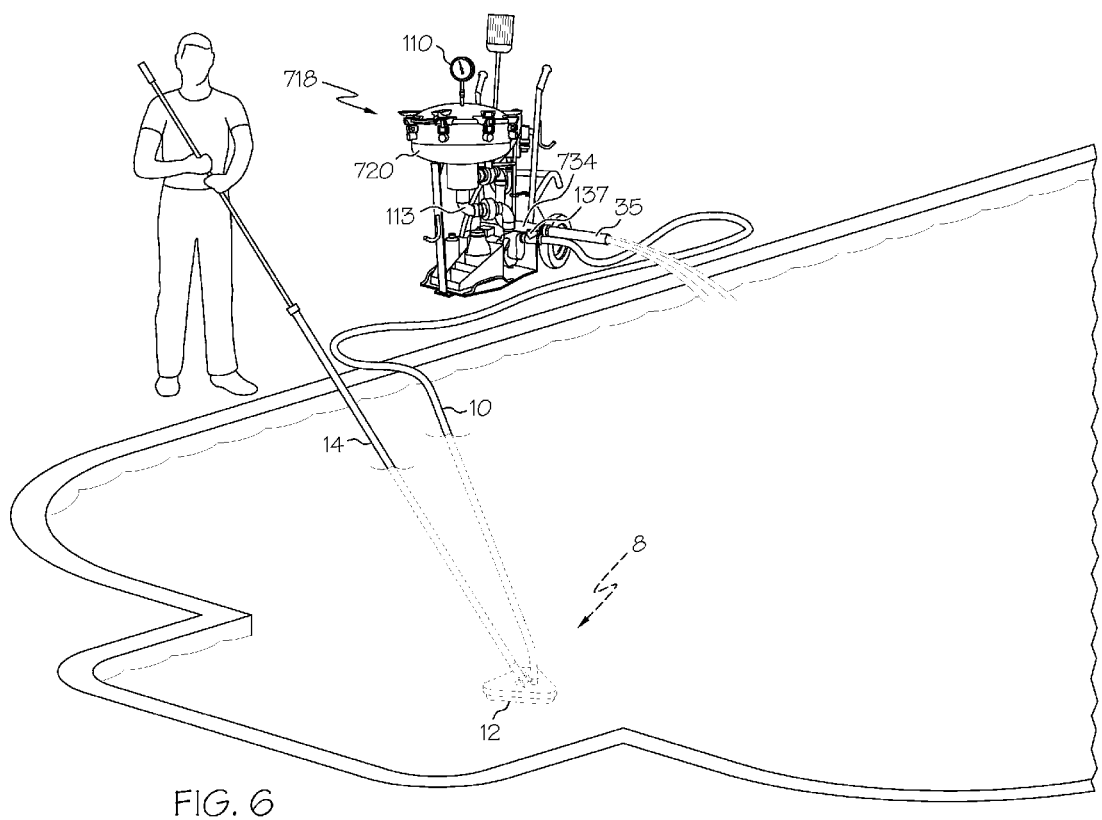
FIG. 6 is a partially elevated perspective view of the pool cleaning apparatus, reflecting a third embodiment of the invention, showing the operation of the invention.

As illustrated in FIGS. 9 and 10, water, leaves and debris enter the filtration device 718 from the pump 1, enter into the transfer pipe 113, then pass into the filtering device inlet 746, through the central inlet tube 102, into the leaf trap spout 900, and upward, to an area under the lid 722. From there, water laden with leaves and debris starts to flow downward, into the modified leaf trap 726, where larger debris is strained out. The water flows downward through the filtration element 114 of the filter 732, out of the vessel 720 through the filtering device outlet 748, through the discharge tube 734, and back into the pool or water feature. As shown in FIG. 6, a discharge extension tube 35 may be attached to the discharge tube 734 to more effectively return treated water back to the source. This embodiment may be described as a "pressurized vessel" water filtration system, and may use a pressure gauge 110 to measure the pressure that is in the vessel 720.

Figure 8:
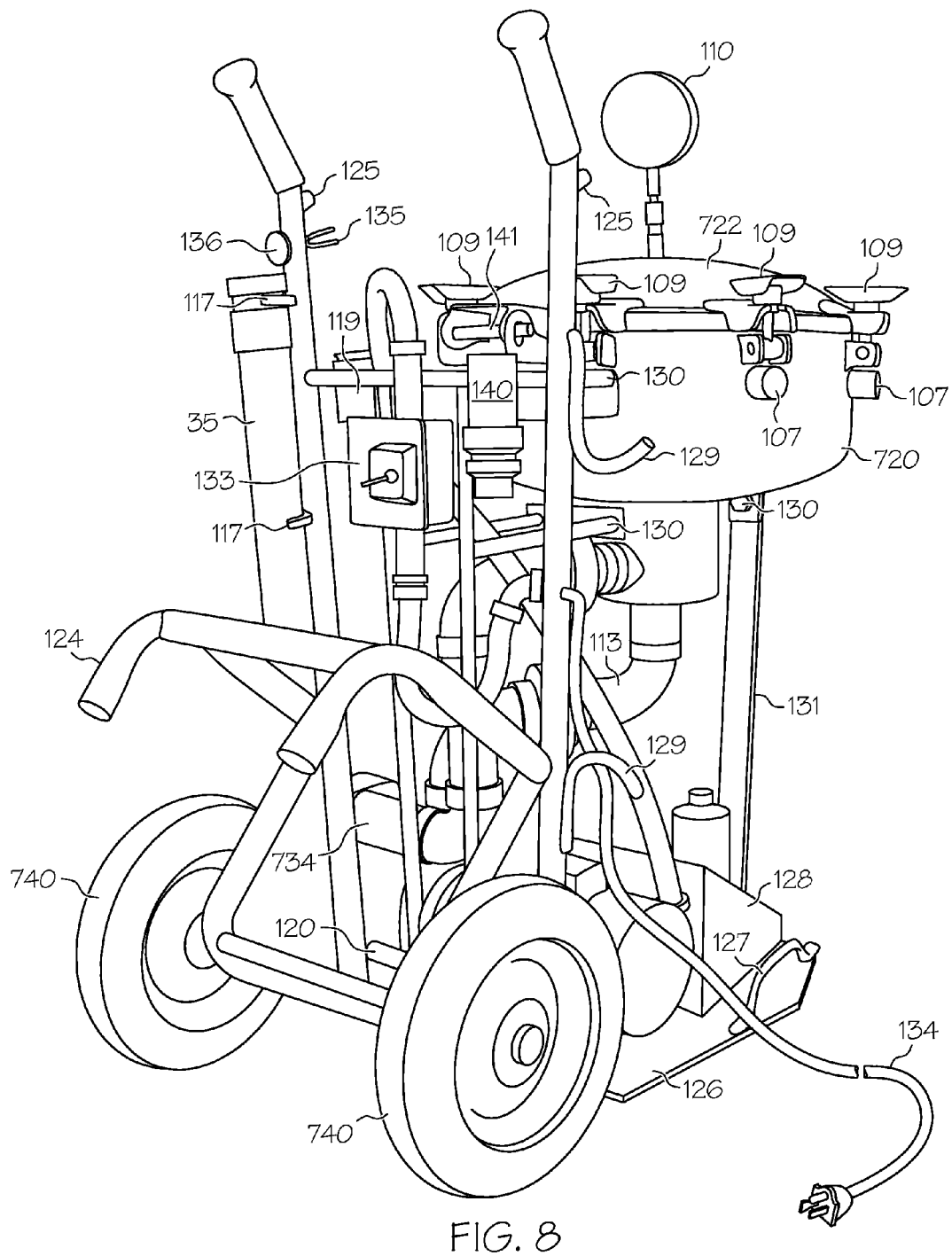
FIG. 8 is a perspective view of the pool cleaning apparatus shown in FIG. 7, showing the back left side thereof.

Referring to FIGS. 6-8, the filtration device 718 may be fastened onto the hand truck 123 by one or more vessel support brackets 130. In one embodiment, the vessel support brackets comprise threaded rods and nuts to secure the filtration device to the hand truck 123. A longitudinal support bracket 131 may be used to support the filtration device 718, and to prevent the filtration device from falling forward. In the embodiment of FIG. 7, anti-slip grips 121 cover the handles, and one or more rubber lid bumpers 125 support the hingedly attached lid 722 when in an open position.

A vacuum wand pole clip 135 may be provided as shown in FIG. 7, to hold the pole and to free up the operator's hands as needed. The vacuum wand pole clip 135 comprises a knob 136 that is used to adjust the position of the vacuum wand pole clip 135. The discharge extension tube 35 may be held to the hand truck 123 by one or more discharge extension tube clips 117.

Further, many home owners like to sweep off their pool deck and walkways. Consequently, some of the embodiments may feature a broom holder 119, and a broom boot 120. It is also possible to wrap the vacuum hose 10 onto the hand truck 123 by securing the brush head component of the vacuum wand 8 into the brush head holder 140, wrapping the hose 10 around the hand truck handles and the vacuum hose hook 124, and finally, by securing the end of the hose 10 onto the hose clip 122. During cleaning, the modified leaf trap 726, the flange nut 103 and the filter 732, may be placed onto small hooks 129.

The hand truck 123 may be made with an elongated toe plate 126, which accommodates the motor 6, and a carrying case 128 suitable for keeping chlorine, water testing devices, cleaners, a priming cup, and other objects fit for operating the apparatus, and for pool maintenance. Two handles 127 are located on the either side of the toe plate which assists in lifting the pool cleaning apparatus. In one embodiment, the hand truck 123 comprises flat-free tires 740 and a vibration insulator 132 to make the apparatus more suitable for use on hard surfaces such as concrete. The motor 6 is operated by a control box 133 having a ground fault interrupter (GFI), which prevents accidental shocks. An electrical cord 134 supplies power to the motor 6.

Figure 12:
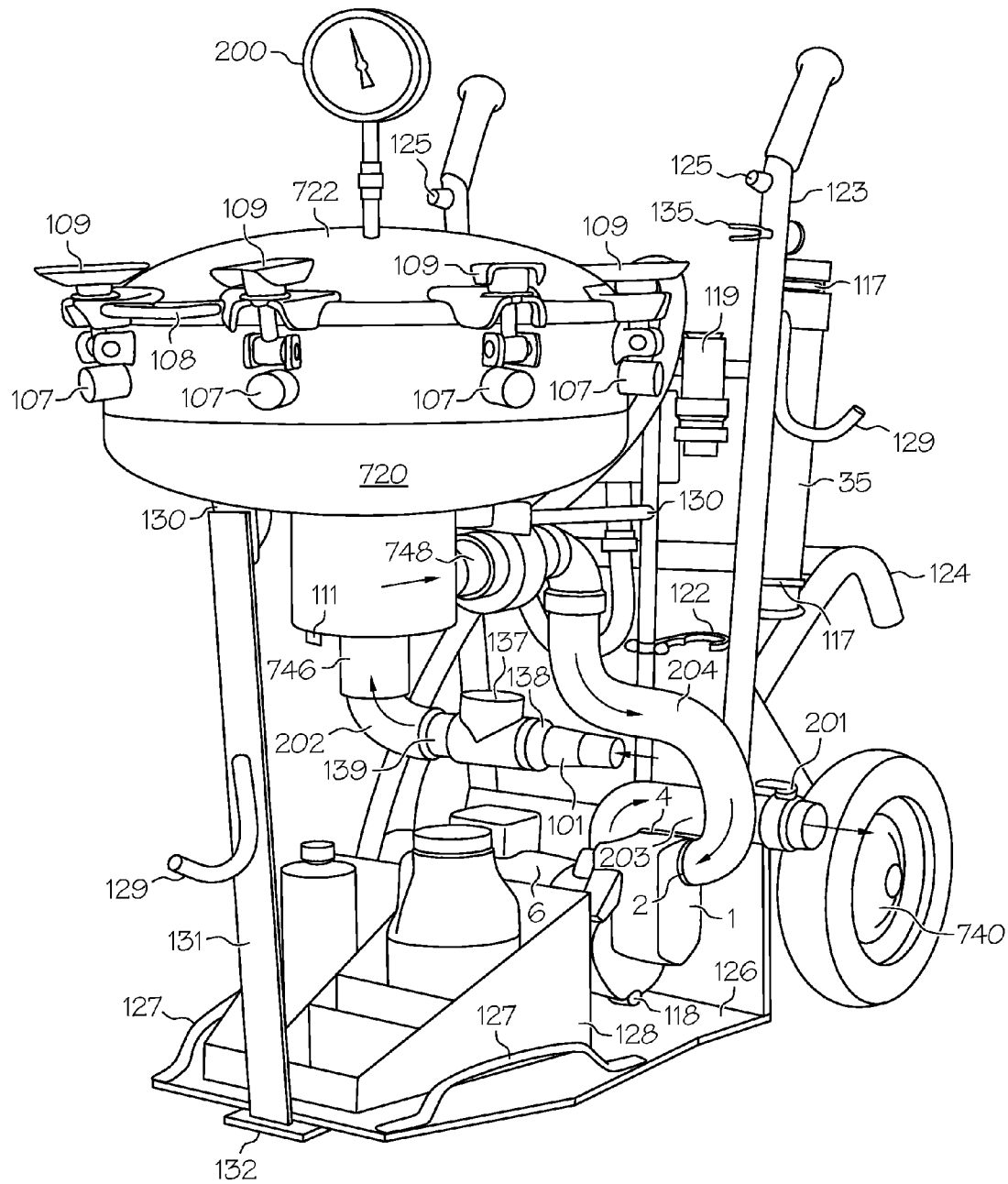
FIG. 12 is a perspective view of the fourth embodiment of the pool cleaning apparatus, showing the front right side thereof.

In another embodiment, which is illustrated in FIG. 12, the vessel supply tube 202, is connected to the filtering device inlet 746, the check valve outlet 139 is connected to the vessel supply tube 202, and the plastic nipple 101 is attached to the check valve inlet 138. A pump supply tube 204 is attached to the pump inlet 2 and the filtering device outlet 748. A small discharge tube 203 having a shut-off valve 201, is attached to the pump outlet 4. The shut-off valve 201, is useful in maintaining prime of the vessel 720 and the pump 1, as needed. The lid may be fitted with a vacuum gauge 200 that measures the vacuum pressure in the vessel 720.

Figure 13:
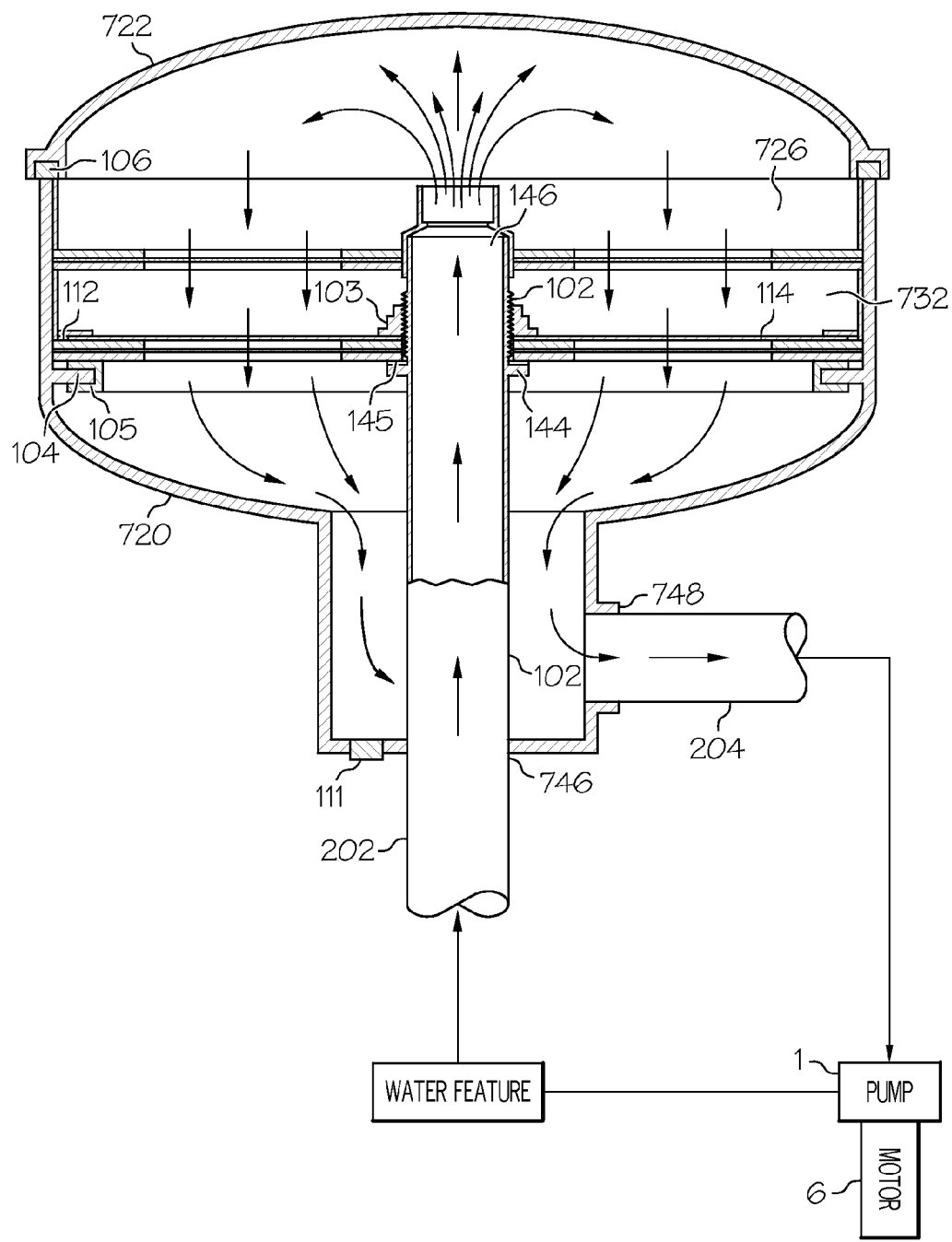
FIG. 13 is a cross section of the filtration device shown of the pool cleaning apparatus shown in FIG. 12, with arrows illustrating the flow of water through the filtration device.

Referring to FIGS. 12 and 13, in this embodiment (and with the attachment of a vacuum wand 10 as previously disclosed) water laden with leaves and debris is pulled from the pool/water feature 400 through the vacuum hose, through the tapering plastic nipple 101, the check valve 137 and the vessel supply tube 202, through the filtering device inlet 746 into the central inlet tube 102, upward toward the lid 722; then it is pulled downward through the modified leaf trap 726, removing larger debris, into the filtration element 114 and filter 732, which removes dirt and smaller particles, through the filtering device outlet 748, into the pump supply tube 204, into the pump inlet 2 and pump 1, out of the pump outlet 4, through the small discharge tube 203, and back into the pool/water feature.

In the embodiment depicted in FIG. 12, hard objects, such as small stones and coins, are filtered out before they reach and possibly damage the pump. This embodiment is useful for use in reflection pools and fountains, and situations where it is difficult to see the type of debris that is being removed. It is generally necessary to prime the vacuum wand, vessel, and pump to create suction to clean the water feature. A shut-off valve may be used in priming the apparatus. This embodiment may be described as a "vacuum vessel" pool cleaner.

Figure 14:
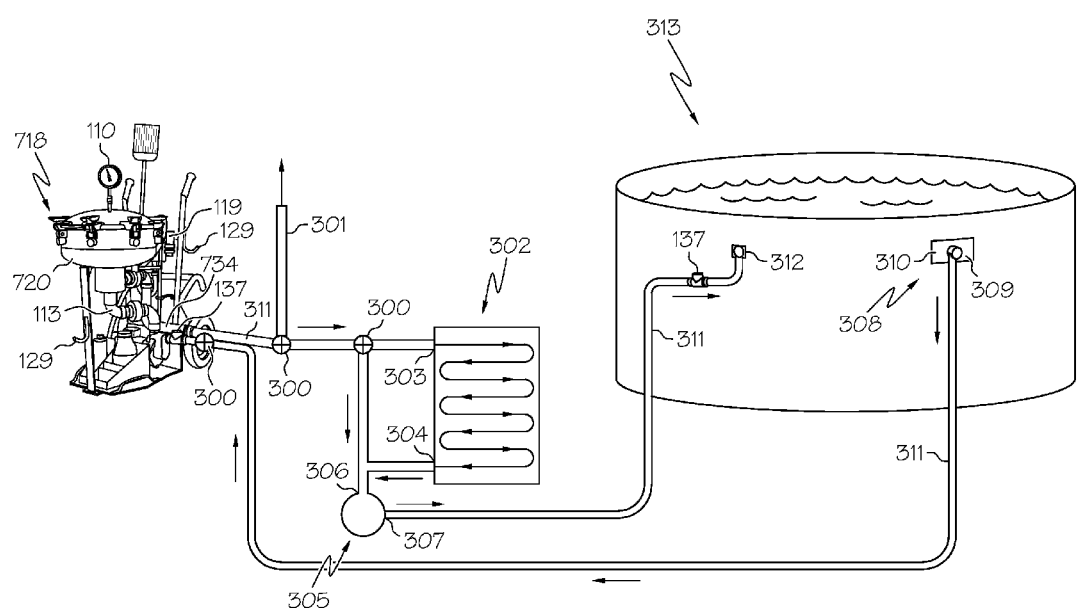
FIG. 14 is a partially elevated perspective view of the pool cleaning apparatus shown in FIG. 7, reflecting the fifth embodiment of the invention, depicting the annexation thereof to an above-ground swimming pool.

A fifth embodiment is depicted in FIG. 14, and may be described as a portable water filtration and cleaning unit. Such an embodiment could be used on a seasonal basis with an above-ground pool 313. In this embodiment, the pressurized vessel type pool cleaner of FIG. 7 is adapted for use with an above-ground pool. The embodiment depicted in FIG. 14, may also employ the "vacuum vessel" type pool cleaner shown in FIG. 12 instead of the "pressurized vessel" type pool cleaner. Nonetheless, the "pressurized vessel" type pool cleaner may be easier to prime.

In adapting the "pressurized vessel" type pool cleaner for use with an above-ground pool 313, as shown in FIG. 14, it is necessary to refer to FIGS. 14, 6, 15, 18, and 19, which correspondingly depicts a portable water filtration and cleaning system attached to an above-ground pool 313, a vacuum wand 8, a self-propelled vacuum wand 402, a modified basket 310, and a suction disc 404.

The above-ground pool 313 is equipped with a skimmer 308 having a drain 309. Polymer tubing 311 is attached to the drain 309, which transports unfiltered water and leaves and debris 405 out of the modified basket 310 which is housed in the drain 309, through polymer tubing, and through water control valves 300 and a check valve 137 into the pump 1. A modified basket 310, having apertures large enough to pass leaves and debris but not larger objects that may clog the polymer tubing 311, is useful in this embodiment. The polymer tubing 311 may be made from polyvinyl chloride or other suitable material. Then, untreated water enters the filtration device 718, wherein leaves and debris are removed, as discussed above. Clean water exits the filtration device 718, the discharge tube 734 and the discharge extension tube 35. Treated (or untreated) water may be drained from the waste water discharge tube 301, by the adjusting the flow of the water with water control valves 300. Treated water flows through a heating unit 302 which may be solar, electric, or other, by entering in at the heater inlet 303, where it is heated, and then flows out of the heater outlet 304, into a mineral filter/chlorine pack combination unit 305, where the treated water enters the filter/chlorine pack inlet 306, is treated, and exits through the filter/chlorine pack outlet 307. Treated water is then pushed back toward the pool via polymer tubing. A check valve 137 is connected to the polymer tubing 311 to prevent possible flooding of the filtration device 718 when the motor 6 is turned off. Treated water then enters the pool or water feature through return jets 312.

Figure 15:
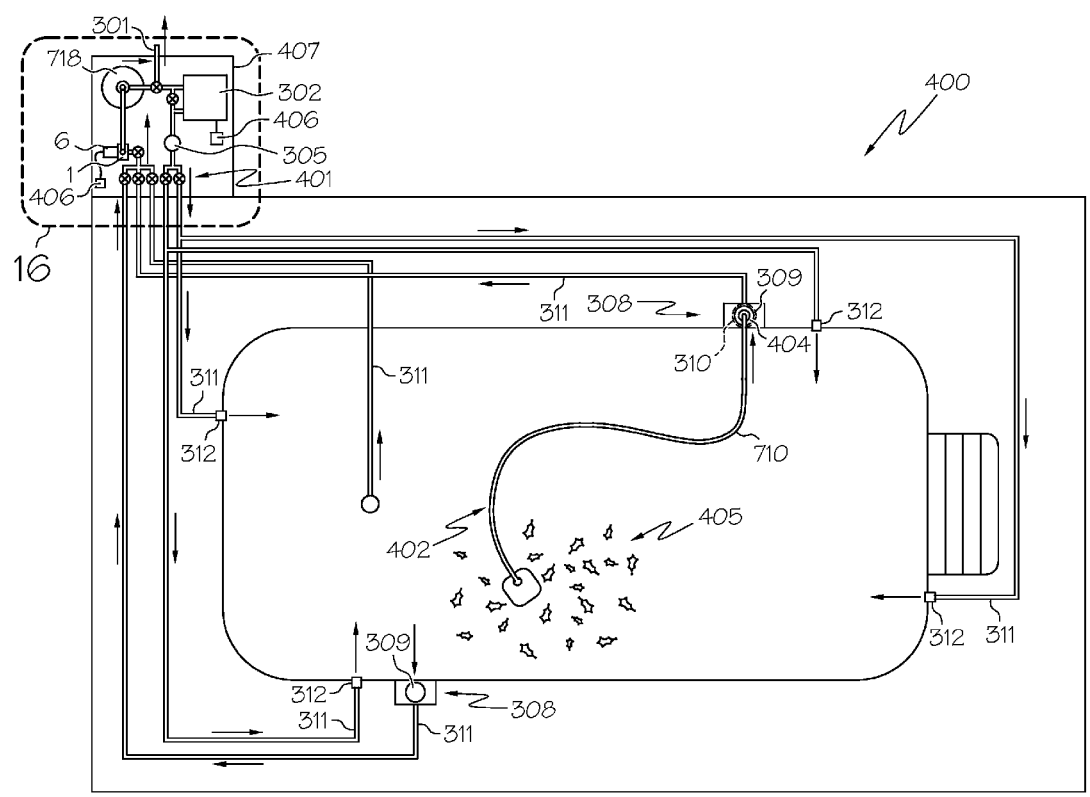
FIG. 15 is a top schematic view of the pool cleaning apparatus, reflecting the sixth embodiment of the invention, depicting the incorporation thereof into the filtration and cleaning system of a pool or water feature.
Figure 16:
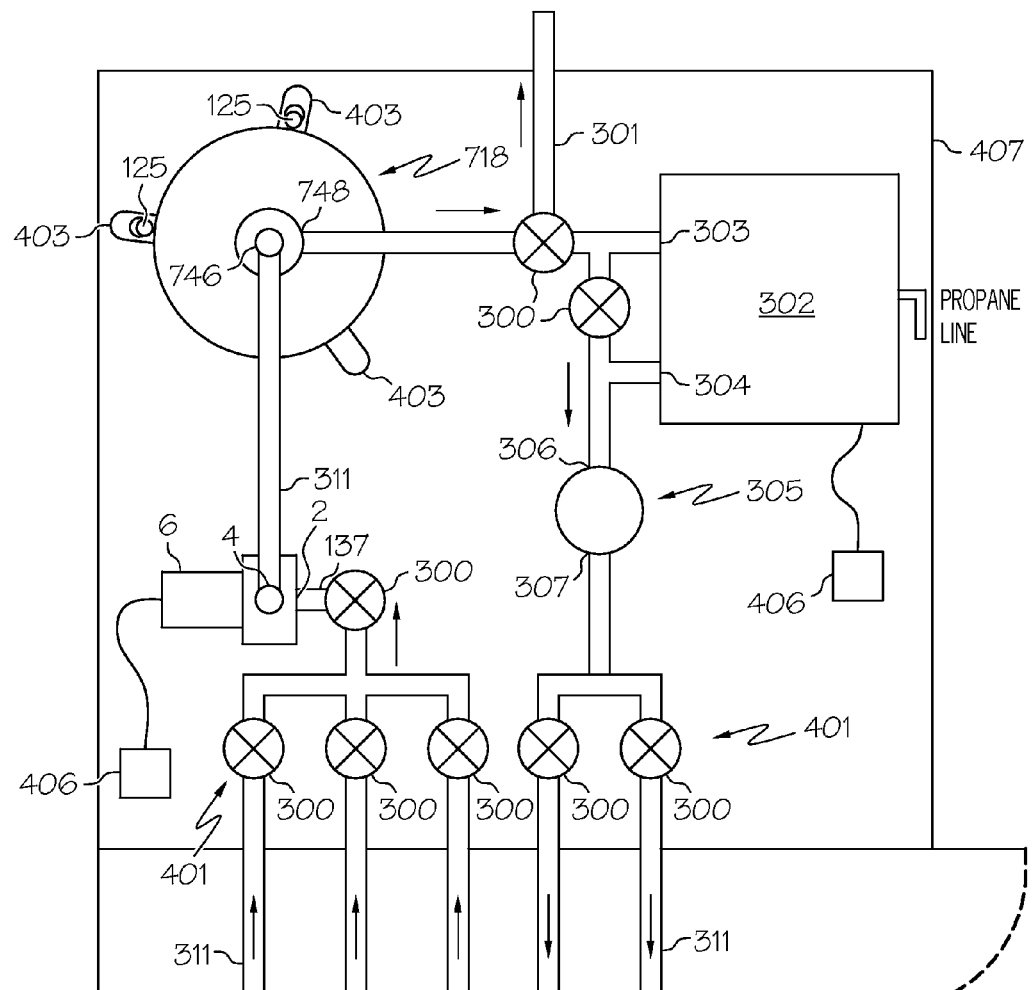
FIG. 16 is a top schematic view of the general set up of the pool cleaning apparatus shown in FIG. 15, showing a diagram of the pump, motor, filtration device, heater, mineral filter-chlorine pack combination unit, water control valves and water control unions.
Figure 17:
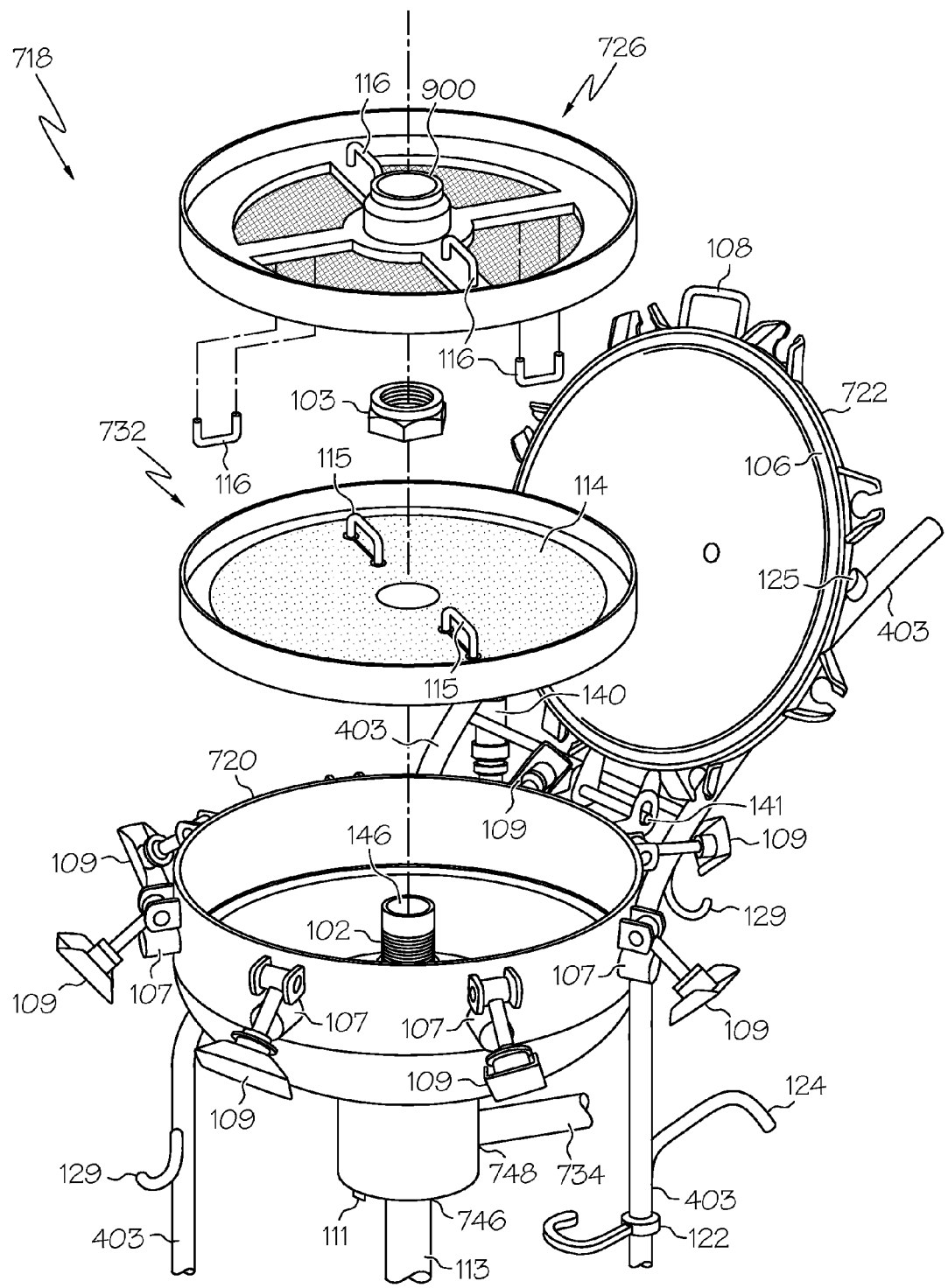
FIG. 17 is an exploded view of the filtration device depicted in FIGS. 6-10 and 12-16, showing the modified frame on which the filtration device is mounted.
Figure 18:
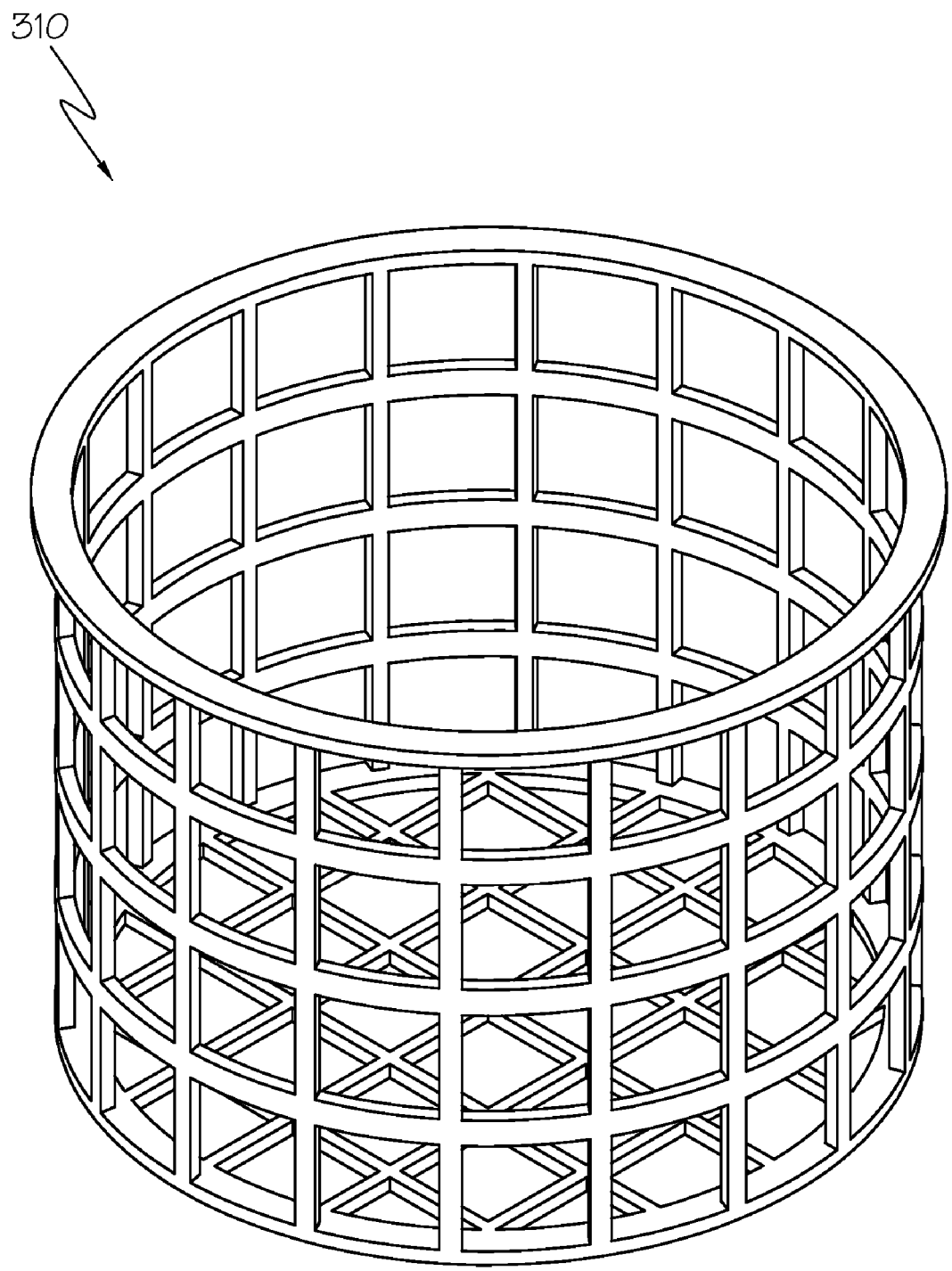
FIG. 18 is a partially elevated perspective view depicting the modified basket which is used with the filtration and cleaning system shown in FIGS. 14 and 15.

The fifth embodiment operates on a full-time basis to circulate, sanitize, and treat water during the season; however, it is also capable of operating as a pool cleaner by inserting a suction disc 404 over the drain 309, and using a vacuum wand 8 as illustrated in FIG. 6, to remove leaves and debris that have sunken to the bottom of the above-ground pool. This eliminates the need for a homeowner to separately purchase an above-ground pool cleaner. Alternatively, cleaning may be accomplished by using a self-propelled vacuum wand 402, as illustrated in FIG. 15. The pool cleaning apparatus may be removed for winter storage, and reattached in spring. Finally, the apparatus may be backwashed as discussed herein.

The pool cleaning apparatus which is the subject of this invention, may also be permanently mounted pool side. In a permanent installation, the apparatus may be used as the pool's primary filtration system and also as a cleaner. This sixth embodiment would also eliminate the need for a homeowner to separately purchase and install a filtration system and a pool cleaner, and may be installed when the pool is being constructed. FIG. 15 illustrates a typical pool/water feature 400, equipped with the skimmer 308 and the drain 309. The modified basket 310 fits down into the drain. The modified basket 310 is made with larger holes, approximately ¾ inches in diameter to allow for the passage of leaves and debris which would otherwise clog the common unmodified basket having apertures which are approximately $1/8^{th}$ of an inch in diameter. The polymer tubing 311 is used as a conduit to circulate debris laden and treated water through the pool cleaning system. During circulation and filtration, unfiltered water is drawn by the pump 1 from the pool/water feature 400. Water exits the skimmer 308 and the drain 309. Larger objects such as sticks and small balls, which may get stuck in the polymer tubing 311, are removed by the modified basket 310. Water enters the polymer tubing 311, and is carried to the check valve 137 if the pump does not have an internal check valve. The check valve 137 helps to keep the pump, which is self-priming, primed.

The motor 6 should be electric since it would be running on a full-time basis, and a 1 or 2 hp electric motor is generally suitable for an approximately 40 feet by 20 feet pool or water feature. In this embodiment, the pump 1 is configured to allow for the passage of leaves and debris without damaging internal mechanisms of the pump. In this embodiment, the pump 1 has an open or semi-open clog-resistant impeller 800. Water and debris leave the check valve 137, enter the pump inlet 2, and is pumped through and out the pump outlet 4. Water leaves the pump 1 and passes through the polymer tubing 311 toward the filtration device 718. The system has water control unions 401 which gather and distribute the flow of treated or untreated water. There are also various water control valves 300 which shut off, and controls the direction and flow of water.

Water enters the filtration device 718 where leaves and debris 405 are removed by the modified leaf trap 726 and smaller particles are removed by the filter 732 and the filtration element 114 as shown in FIG. 10. Filtered water then leaves the filtration device 718 and flows toward a waste water discharge tube 301, which may be used to drain the pool, and to aid in backwashing operations as described below. Treated water then enters a heating unit 302 which may be solar, electric, or other, circulates, and further enters the mineral filter/chlorine pack combination unit 305 which adds water stabilizing minerals and chemicals, including chlorine, to the treated water before the same is returned to the pool/water feature 400. Treated water enters and exits a water control union 401 by the polymer tubing 311 and enters the pool via return jets 312.

Figure 19:
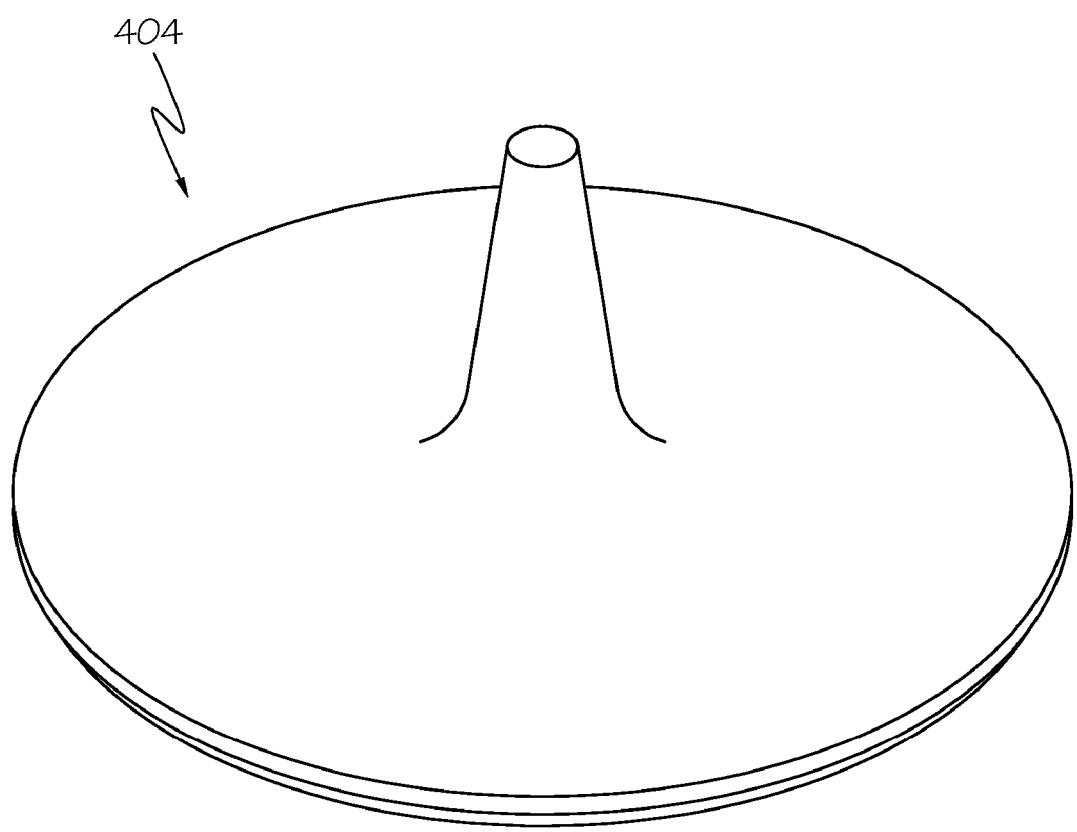
FIG. 19 is a partially elevated perspective view of the suction disc, showing tapering nipple and gasket, which covers the pool drain during cleaning.

The permanently mounted or installed apparatus is capable of manual cleaning and removal of leaves and debris 405, by putting a suction disc 404 over the drain 309, and attaching the end of the vacuum hose 10 unto the aperture of the suction disc 404 as shown in FIGS. 19 and 15. Alternatively, the pool/water feature 400 may be cleaned by a self-propelled vacuum wand 402 which may be more appropriate for larger pools/water features. The automatic vacuum hose 710, which tends to be less stiff than the vacuum hose 10, goes over suction disc 404. It may be necessary to prime the vacuum hose 10, or the automatic vacuum hose 710 and or the pump 1 to create suction and cleaning of pool walls and floors.

The pool cleaning apparatus may be permanently mounted pool-side, as shown in FIG. 15. This may be accomplished by pouring the concrete over the modified frame 403 and allowing the concrete to set-up, forming a concrete base 407; or by the use of hardware such as bolts, screws and nuts. The modified frame 403 has 2 rubber lid bumpers 125, small hooks 129 on which to hang the modified leaf trap 726, the filter 732, and other objects. Also, the modified frame 403 has a brush head holder 140, and a hose clip 122, so that the vacuum wand 8 may remain pool-side. Power to the motor 6 is supplied pool side by an electrical power source 406.

Figure 20:
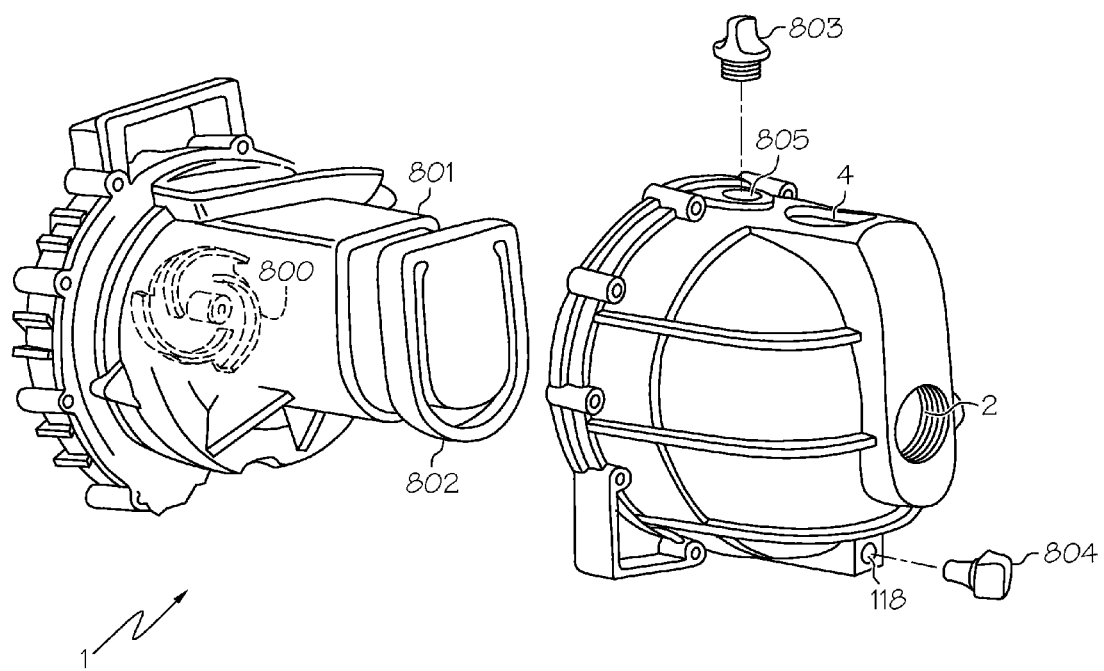
FIG. 20 is an exploded view of a pump.

The present invention utilizes a self-priming pump. During cleaning and use, air may get into the vacuum hose 10 causing a loss of prime. In that situation, a self priming pump would quickly re-prime so that operation of the apparatus may continue. FIG. 20 illustrates a pump 1, which comprises a clog-resistant impeller 800 (which may be partially to completely open, depending on the size of the leaves, debris, and solids being passed), housed inside a volute 801, with the volute 801 designed to extend to the pump inlet 2, with the said volute 801 having a flapper valve 802 which is in contact with the pump inlet 2. This design is capable of creating a greater vacuum which helps to more quickly regain prime. Ideally, the pump will only need an initial prime at the beginning of the season. The pump 1 may be designed so that some water will remain therein after use. The small amount of water which stays in the pump should be sufficient to prime a dry vacuum hose 10, and to begin suction and cleaning my merely turning on the pump 1. This pump 1 also contains a drain 118, a drain plug 804, a pump fill 805 which helps with the initial priming of pump 1, a pump fill plug 803, and a pump outlet 4. The pump 1 shown in FIG. 20 eliminates the need to separately purchase a check valve 137, because the flapper valve 802 located inside the pump 1, functions to keep water inside the pump 1, and to maintain and regain prime. Priming of the pump may be achieved in many ways, including putting water into the inlet tube 102 opening when the lid 722 is open, via the pump fill 805, by submerging the hose into the water being cleaned to remove air, and by putting the end of the vacuum hose 10, or automatic vacuum hose 710, over the return jets 312 to fill the hose 10 with water, thereby removing air.

The modified leaf trap 726, and the filtration element 114, are capable of being backwashed by inverting them in the filtering device (the filtration element 114 is inverted and placed in the filter 732), securing the lid 722 to the vessel, and starting the motor 6. Leaves, debris, and dirt will then leave the filtration device through the discharge tube 734, or the waste water discharge tube 301, depending on the embodiment being used. The filter container 729 has peripheral surfaces containing sufficiently large apertures that allow dirt and debris trapped in the filtration element 114 to wash away. Alternately, the filtering device, leaf trap, filter, and filtration element may be cleaned by spraying and washing these components with a garden hose or other suitable source of water.

Although the principles, alternate embodiments, and operation of the present inventions have been described in detail herein, this is not to be construed as being limited to the particular illustrative forms disclosed. It will thus become apparent to those skilled in the art that various modifications of the embodiments herein can be made without departing from the spirit or scope of the invention as defined by the appended claims.

What is claimed is:

1. A pool cleaning apparatus configured to clean water containing leaves and debris in a swimming pool, said apparatus comprising:
    a pass through pump having an inlet and an outlet, said pump further comprising a partially open to fully open impeller configured to pass said leaves and debris;
    a vessel having a lid, said vessel comprising a filter and a leaf trap positioned above said filter;
    an inlet tube connected to said pump outlet, said inlet tube extending upwardly inside said vessel and having an outlet operatively positioned above a bottom of said leaf trap for dispensing water containing said leaves and debris into said leaf trap;
    a motor mechanically coupled to said pump;
    an intake hose configured to be in fluid communication with said swimming pool and being connected to said pump inlet; and
    a hand truck having a toe plate and one or more vibration insulators secured beneath the toe plate; wherein said motor is secured to the top of the toe plate.

2. The pool cleaning apparatus according to claim 1, wherein said vessel further comprises:
    a positive stop around an interior perimeter side wall; and
    a gasket operatively positioned on said positive stop;
    wherein said filter seals against said gasket.

3. The pool cleaning apparatus according to claim 1, wherein said filter comprises a filtration element made of polymer fibers.

4. The pool cleaning apparatus according to claim 1, wherein the inlet tube enters said vessel beneath said filter and passes through said filter for discharging into said leaf trap.

5. The pool cleaning apparatus according to claim 1, wherein said inlet tube is vertically positioned through said filter and said leaf trap, said tube outlet being positioned above said leaf trap.

6. The pool cleaning apparatus according to claim 1, wherein said filter and leaf trap comprise one or more handles.

7. The pool cleaning apparatus according to claim 1, wherein said pump is self priming.

8. The pool cleaning apparatus according to claim 1, said vessel further comprising:
    a lid gasket operatively sealing said lid to said vessel; and
    at least one hold down latch releasably connecting said lid to said vessel.

9. The pool cleaning apparatus according to claim 1, wherein said motor is selected from the group consisting of a gasoline engine, a diesel engine, and an electric motor.

10. The pool cleaning apparatus according to claim 1, wherein said lid further comprises:
    a pressure gauge, operably indicating an amount of pressure inside of said vessel.

11. A permanently mounted pool cleaning apparatus configured to clean water containing leaves and debris in a swimming pool, said apparatus comprising:
    a pump having an inlet, an outlet and a partially open to fully open impeller configured to pass said leaves and debris;
    said pump inlet being in fluid communication with a skimmer;
    a vessel having a sealable lid, an inlet and an outlet;
    tubing connected to said vessel outlet and in fluid communication with return jets of said swimming pool;
    a filter positioned in said vessel;
    a leaf trap positioned above said filter;
    a tube extending upwardly inside the vessel and having an inlet and an outlet; said tube inlet connected to said pump outlet and said tube outlet operatively positioned above a bottom of said leaf trap to dispense said water containing said leaves and debris into said leaf trap; and
    a motor mechanically coupled to said pump; wherein said pump, motor and vessel are mounted onto a frame or hand truck.

12. The apparatus of claim 11, further comprising:
    means for straining larger debris items from water operably positioned before said filter;
    wherein said inlet tube dispenses said water and debris into said straining means.

13. The pool cleaning apparatus according to claim 11, wherein said inlet tube is positioned vertically through the center of said vessel.

14. The pool cleaning apparatus according to claim 13, wherein said inlet tube passes through said filter for dispensing water and debris into said filtering means.

15. The pool cleaning apparatus according to claim 11, wherein said vessel further comprises:
    an access opening closed by a lid;
    a lid gasket operatively sealing said lid against said vessel; and
    at least one hold down latch releasably connecting said lid to said vessel.

16. The pool cleaning apparatus according to claim 11, wherein said filter comprises a fibrous polymer filter element.

* * * * *